April 20, 1954        L. F. KNIGHT        2,676,229

APPARATUS FOR CONCURRENTLY BENDING AND FORGING BAR STOCK

Filed May 7, 1951        2 Sheets-Sheet 1

Inventor
LORNE F. KNIGHT
by: Fetherstonhaugh & Co.
Attys.

April 20, 1954   L. F. KNIGHT   2,676,229
APPARATUS FOR CONCURRENTLY BENDING AND FORGING BAR STOCK
Filed May 7, 1951   2 Sheets-Sheet 2

Inventor
LORNE F. KNIGHT

Patented Apr. 20, 1954

2,676,229

UNITED STATES PATENT OFFICE 2,676,229

APPARATUS FOR CONCURRENTLY BENDING AND FORGING BAR STOCK

Lorne F. Knight, Toronto, Ontario, Canada, assignor to Massey-Harris Company Limited, Toronto, Ontario, Canada Application May 7, 1951, Serial No. 224,937

2 Claims. (Cl. 219—3)

This invention relates to a method of and apparatus for concurrently forging and bending bar stock particularly adaptable to the manufacture of coulter shanks or the like and wherein one heating operation only is required.

This application is related to my prior applications, Serial No. 92,982, filed May 13, 1949, issued as Patent No. 2,555,695, dated June 5, 1951 and Serial No. 182,438, filed August 31, 1950.

The method and apparatus of the invention will be described with reference to the manufacture of coulter shanks, although it will be appreciated that the invention has general application to the fabrication of articles from bar stock.

In the manufacture of coulter shanks in particular, a crank-like article is formed wherein one end is forged to provide a rectangular block-like form or other suitable end form adapted to engage into a socket for gripping drive or other operative relation with the shank. It is usual to forge the rectangular block-like gripping means on the end of a length of bar stock as a preliminary step while the stock is straight. Thereafter the stock is again heated and a double bend formed therein often through a series of operations to form a crank-like article. The formation of a simple article thus may require a multiple operation and equipment.

Having regard to the foregoing it is the main object of the present invention to provide a method of and apparatus for forming a coulter shank wherein a straight length of bar stock is caused to be clamped near the ends and an electrical current passed therebetween to heat the stock to a deforming temperature. The bar stock is also clamped at intermediate regions, the latter being insulated from the end clamps and from one another, thus defining a series of deformable regions in the bar stock separated by the clamps therealong. One of these regions is so controlled according to the invention that the temperature thereof reaches a value whereat forging by means of a die mechanism may be accomplished with facility. Just previous to the die action, the electrical current passing between the end clamps through the bar stock is preferably cut off. The die action serves to form a rectangular block formation at this deformable region of higher heat content. Immediately after and concurrently with the die forging operation and while the other deformable regions are still at the deforming temperature the intermediate clamps come into action and are moved to a position outside the original axial line of the bar stock. The movement of such clamps and the details of construction and the like are disclosed in the said related applications. After the clamps have been moved to the predetermined final positions to accomplish the necessary bending functions, the bar stock is allowed to cool to a temperature at which it is sufficiently rigid for removal from the clamps. The bar stock is then severed in the region of the rectangular block-like formation to form a pair of coulter shanks.

In its broader aspect, the invention contemplates the concurrent forging and bending of bar stock at separate points in the one heat.

Other objects of the invention will be appreciated by a study of the following specification taken in conjunction with the accompanying drawings.

Figure 1:
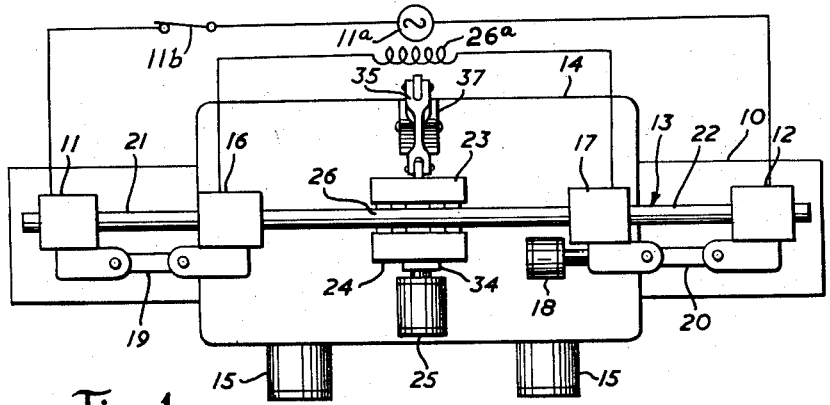
Figure 1 illustrates a plan view of apparatus according to the invention showing a length of bar stock set therein ready for application of electric heating current through the bar stock between the end clamps thereof.

Referring in more detail to the drawings the apparatus of the invention is illustrated in Figures 1 to 4. The apparatus comprises a machine bed 10 upon which are mounted the end clamps 11 and 12, at least one of which is electrically insulated from the bed, both being slidable axially of the bar stock 13 held thereby. The construction of these clamps, their associated mechanism hereinafter disclosed, and the cooling thereof is in accordance with the teachings of the said related application wherein a method and apparatus was shown for forming multiple bends in a straight length of bar stock. In the present case, however, I disclose a means of forging a portion of the bar stock and yet only requiring that the bar stock be heated once for the complete forging and bending operations, which latter are effected concurrently.

Accordingly, a secondary bed 14 is slidably mounted on the primary bed 10 and is slidable laterally of the longitudinal axis of the bar stock 13 under action of suitable pneumatic or hydraulic rams 15. A pair of intermediate clamps 16 and 17 is mounted on the secondary bed 14 and preferably the clamp 16 is fixed to the secondary bed whereas the clamp 17 is slidably mounted thereon by suitable guides such as a dovetailed slide or the like allowing movement of the clamp 17 in the direction of the longitudinal axis of that portion only of the bar stock which extends between the clamps 16 and 17. Thus, the clamp 17 may be controlled in such movement by a suitable ram device 18 mounted on the secondary bed but operatively connected to the clamp 17. The various clamps are electrically isolated from one another.

In accordance with the teachings of the said previous applications the end clamps 11 and 12 are preferably operatively inter-connected such as by links 19 and 20 so that bends may be formed in the deformable regions 21 and 22 without material stretching of the bar stock.

The secondary bed carries cooperating die heads 23 and 24 both operatively related to a ram 25. In the position of the die heads illustrated in Figure 1, they are spaced from the forgeable portion 26 of the bar stock existing between the intermediate clamps 16 and 17.

According to the method herein, an electric current from a source 11a controlled by suitable switch means 11b is caused to pass through the bar stock 13 between the endmost clamps 11 and 12 to cause the deformable regions 21 and 22 (see Figure 2) to reach a deforming temperature and the forgeable region 26 to reach a forging temperature. From a purely electrical concept, one would ordinarily assume that the portion 26 of the bar stock being of greater length in the illustration of Figure 2 would rise to a lesser final heat value than the deformable portions 21 and 22. However, such is not necessarily the case even though the bar stock may be of uniform section or diameter for the clamps 11 and 12, 16 and 17 are preferably cooled and the action of these clamps in drawing heat energy from the bar stock is of more consequence from a heat concept than any differences arising in the bar stock by reason of differences in length at the different regions. Accordingly, the different regions of the bar stock may be controlled in their temperature or final heat value by means of suitable electrical shunts such as shunt 26a. Thus, in the present illustration, if the region between the clamps 16 and 17 were of a length shorter than either of the deformable regions 21 or 22 then the clamps 16 and 17 would dissipate sufficient heat energy from the forgeable region that it would not rise to a temperature greater than the temperatures in the regions 21 and 22 at any one instant of heating. Therefore, in such instance and in compliance with my prior teachings of the said applications I cause the deformable regions 21 and 22 to be electrically shunted to reduce the electrical current therein and to thereby control the rate of heating of these regions with respect to the forgeable region.

An alternative condition may also arise wherein the forgeable region is of such extreme length that the heat dissipation factor of the clamps 16 and 17 at the ends thereof is of little consequence in which case it may be necessary to shunt this section rather than the other two. This case will seldom arise and represents only an opposite extreme.

Figure 2:
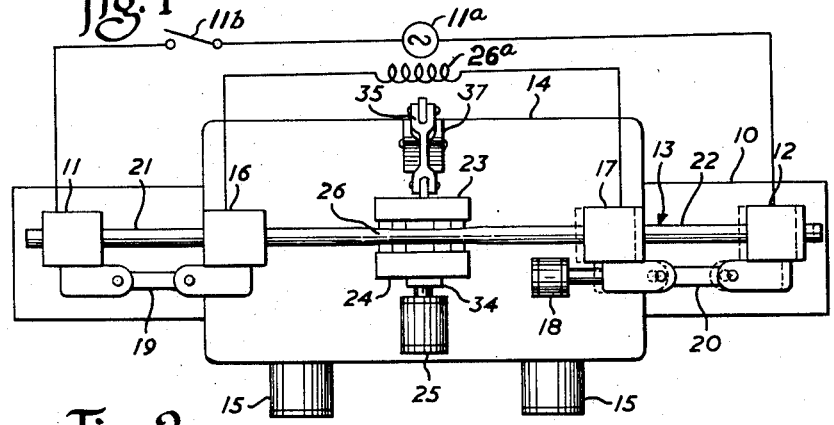
Figure 2 is a developed view of the apparatus of Figure 1 illustrating the stretching of the bar stock in a forgeable region after heating thereof.
Figure 3:
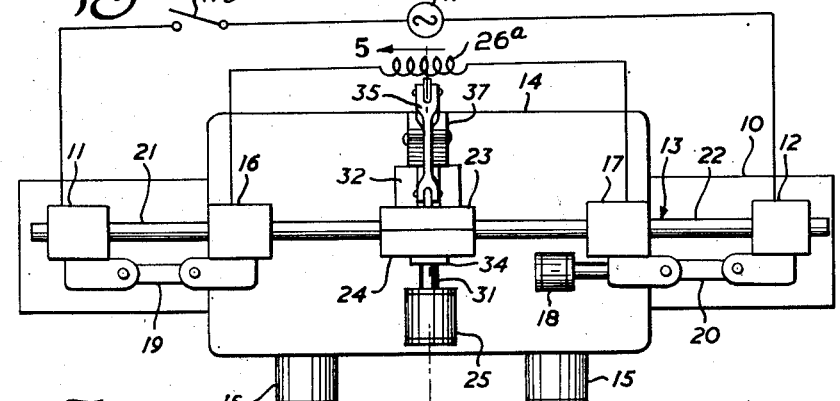
Figure 3 illustrates the action of a die head on the deformable region of the bar stock.

When the bar stock has attained sufficient heat, which in this case will be controlled in accordance with the heat value attained in the forgeable region 26, the electrical current is cut off such as by opening a suitable switch device 11b. As illustrated in Figure 2, the clamp 17 immediately after the cut-off of electrical current through the bar stock, is moved in a direction away from the clamp 16 a predetermined amount to cause a necking or slight reduction in cross-sectional dimension of the bar stock in the forgeable region 26. One might assume that the necking characteristics might extend entirely between the clamps 16 and 17 under movement of the clamp 17. Ordinarily this would be the case if one were to neglect the heat dissipation factor of the clamps 16 and 17. The final result in practice is substantially as illustrated, since the forging temperature only reaches the maximum desired value over a relatively short length of the entire so-called forgeable region existing between the clamps 16 and 17. It will be realized that this is due to heat dissipation from the bar stock toward the clamps 16 and 17.

After the operation illustrated in Figure 2, the die heads 23 and 24 immediately come into action and meet at the necked portion of the forgeable region to forge the bar stock into a desired shape. It will be realized that these die heads may be of a nature and design adapted to form a splined shaft or gear-like formation, or a formation which in section is of triangular, rectangular, square, elliptical, or circular cross-section. Accordingly, the die heads 23 and 24 may be of a construction in respect to the die faces determined by conventional die practice in this regard and may be cooled or uncooled as conditions may dictate in accordance with well known practice.

Figure 4:
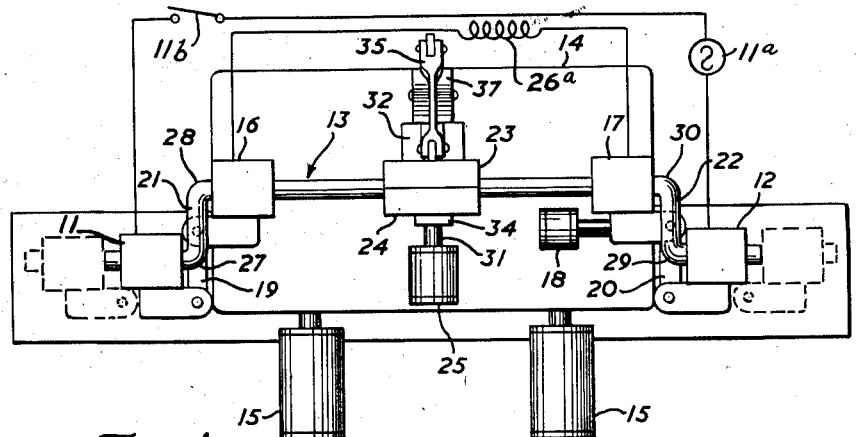
Figure 4 illustrates the movement of the intermediate clamps of the apparatus of the previous figures and the forging head in the bending operation.

The forging operations having been completed, the bending operations of the present apparatus are then accomplished by the rams 15 coming into action concurrently and immediately thereafter while the deformable regions 21 and 22 maintain sufficient heat for the bending operation. Thus, as illustrated in Figure 4, the secondary bed moves transversely of the original axis of the bar stock to a final predetermined position. Accompanying this movement the end clamps 11 and 12 by means of the links 19 and 20 are caused to move inwardly. If desired, such end clamps may be positively urged by means of rams thereon (not shown) extending for action from the primary bed 10.

A double bending of the bar stock in each of the deformable regions 21 and 22 is thus accomplished at the points 27, 28, 29 and 30. The forged and bent bar stock remains in the position in the apparatus as illustrated in Figure 4 until it is cooled sufficiently for removal from the apparatus without damage. The clamps are actuated in locking and unlocking and are of similar detailed nature to that disclosed in the said previous applications.

Figure 5:
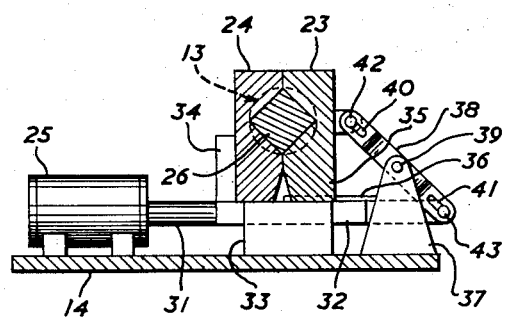
Figure 5 is view 5—5 of Figure 3.

The actuation of the die heads 23 and 24 is more clearly illustrated in Figure 5. Thus, the ram 25 fixed to the secondary bed 14 has its piston arm 31 disposed to actuate the sliding plate 32. Plate 32 is slidably mounted in a bracket 33 extending from the secondary bed 14, one end of said plate having means 34 extending upwardly therefrom to fixedly mount the die head 24. The other die head 23 has its base portion 35 slidably keyed along the plate 32 such as a dovetailed slide 36 thereon. A bracket 37 extends upwardly from the bed 14 to pivotally mount a lever arm 38 by a pin 39, the arm connecting in its free slots 40 and 41 to the pivot 42 on the die head and the pivot 43 on the plate, respectively. There will be many obvious modifications of this specific construction which will be apparent to skilled persons.

Figure 6:
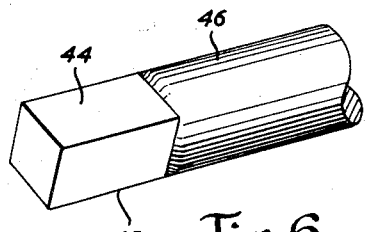
Figure 6 illustrates the type of gripping end formed on the final coulter shank after separation of a pair thereof according to the invention.

After the forged and bent bar stock is removed from the apparatus, it may be separated into two pieces by cutting through the formed forged portion, thus to form a coulter shank end 44 of rectangular block-like nature illustrated in Figure 6. In respect to this particular formation, it will be appreciated that the necking of the shank in the first instance before forging enables the shaping of a rectangular block-like end construction of the type shown wherein the edges 45 thereof do not project beyond the cylindrical surfaces 46 of the shank itself, that is, the resulting transverse dimension corner-to-corner of the block formation corresponds substantially to the diameter of the shank, the latter remaining substantially undisturbed throughout all operations. It is, of course, possible to form an enlargement of cross-section at this region accompanied by a forging action by initially arranging the clamp 17 in the position illustrated in Figure 2 while the bar stock is cooled and then moving it to the position shown in Figure 1 when the bar stock has reached a forging temperature at the forgeable region. In this way some other enlarged formation may be forged on the shank.

As a further alternative method with the present apparatus I may make electrical connection between the clamp 11 and clamp 17, say, as the endmost clamps and disregard the clamp 12 in which case the bar stock may only extend between the clamps 11 and 17. This method is employed for the accomplishment of special end formations on a shank having bends therein and particularly where an enlargement is desired in such end formation and where it is not practical to make two similar articles at the one time and to separate such articles after the formation of a pair from one length of bar stock at the forged formation.

What I claim as my invention is:

1. Apparatus for bending and forging bars at separate bendable and forgeable regions thereof, in one heat, comprising in combination: a primary machine bed; a secondary machine bed slidable on said primary bed transversely of the latter; a series of clamps mounted on said beds electrically isolated from one another and axially aligned when said secondary bed is disposed in a retracted position on said primary machine bed; means supporting two of said clamps on said secondary machine bed permitting relative axial movement thereof; means slidably supporting the remainder of said clamps on said primary machine bed for axial movement therealong; link means operatively relating the clamps of the primary machine bed and the clamps of the secondary machine bed; die forging mechanism mounted on said secondary machine bed movable therewith and disposed between the clamps thereof; means for supplying electrical current to a straight length of bar stock held by said clamps when said secondary bed is in the retracted position to cause portions of said bar stock between adjacent clamps to heat to a deforming temperature; and means for concurrently actuating said secondary machine bed in transverse motion and said die forging mechanism to effect substantially simultaneous forging and bending operations on the said bar stock.

2. Apparatus for bending and forging bar stock at separate bendable and forgeable regions thereof, comprising, in combination: a machine bed; clamps mounted on said machine bed for gripping the bar stock at the ends of the bendable and forgeable regions thereof; means for passing an electric heating current simultaneously through the bendable and forgeable regions of said bar stock while the latter is gripped by said clamps to cause each of said regions to attain a deforming temperature; means for moving one of said clamps at one end of the bendable region of the bar stock in a direction transversely of the axis of the bar stock in the bendable region before bending thereof; die means mounted on said bed for forging the forgeable regions of said bar stock while the latter is at the deforming temperature; means for moving one of said clamps at one end of the forgeable region of the bar stock in the direction of the axial line of the forgeable region of the bar stock; a secondary machine bed mounting said die means and the clamps at the end of said forgeable region on said machine bed; and means for moving said secondary machine bed relative to said first mentioned machine bed.

References Cited in the file of this patent

UNITED STATES PATENTS

| Number | Name | Date |
|---|---|---|
| 1,237,371 | Murray | Aug. 21, 1917 |
| 1,847,631 | Soss | Mar. 1, 1932 |
| 2,195,775 | Gaspar | Apr. 2, 1940 |
| 2,393,155 | Gaspar | Jan. 15, 1946 |
| 2,507,817 | Ropp et al. | May 16, 1950 |
| 2,555,695 | Knight et al. | June 5, 1951 |
| 2,570,548 | Hanna | Oct. 9, 1951 |
| 2,581,774 | Stone | Jan. 8, 1952 |

FOREIGN PATENTS

| Number | Country | Date |
|---|---|---|
| 247,602 | Great Britain | Dec. 31, 1927 |